United States Patent [19]

Terasawa

[11] Patent Number: 4,650,295
[45] Date of Patent: Mar. 17, 1987

[54] WIDE ANGLE AND VARIABLE MAGNIFICATION LENS SYSTEM FOR FINITE DISTANCE

[75] Inventor: Hidenori Terasawa, Kawasaki, Japan
[73] Assignee: Nippon Kogaku K. K., Tokyo, Japan
[21] Appl. No.: 717,651
[22] Filed: Mar. 29, 1985
[30] Foreign Application Priority Data Apr. 3, 1984 [JP] Japan ................................ 59-66457

[51] Int. Cl.⁴ .......................... G02B 15/00; G02B 9/64
[52] U.S. Cl. .................................................. 350/425
[58] Field of Search ............... 350/425, 446, 450, 463

[56] References Cited
U.S. PATENT DOCUMENTS 3,973,831 8/1976 Minoura ............................ 350/425
4,037,937 7/1977 Minoura ............................ 350/425

Primary Examiner—John K. Corbin
Assistant Examiner—Rebecca D. Gass
Attorney, Agent, or Firm—Shapiro and Shapiro

[57] ABSTRACT

The wide angle and variable magnification lens system for finite distance consists of a first lens group whose focal length is negative as a whole, a second lens group whole focal length is positive as a whole, an aperture stop, a third lens group whose focal length is positive as a whole and a fourth lens group whose focal length is negative as a whole arranged in the named order from the object side and symmetrically relative to said aperture stop. The focal length of the total lens system is variable by changing the spacing between the first and the second lens groups and the spacing between the third and fourth lens groups by approximately the same amount. The first lens group comprises, in the order from the object side, a first component of a negative meniscus lens with its concave surface facing to the aperture stop, a second component of a negative lens and a third component of a positive meniscus lens with its convex surface facing toward the object side, and the fourth lens group comprises, in the order from the image side, a tenth component of a negative meniscus lens with its concave surface facing to the aperture stop, a ninth component of a negative lens and an eighth component of a positive meniscus lens with its convex surface facing toward the image side.

11 Claims, 10 Drawing Figures

WIDE ANGLE AND VARIABLE MAGNIFICATION LENS SYSTEM FOR FINITE DISTANCE

BACKGROUND OF THE INVENTION

1. Field of the Invention

The present invention relates to a variable magnification lens useful for plate-making, copy-making etc. which is able to change the magnification of image in a range including one-to-one magnification.

2. Description of the Prior Art

In the past there are known such variable focus lenses useful for plate-making which is variable in magnification at a definite object-image distance. Some typical examples thereof are disclosed in Japanese Laid Open Patent Application No. 49,453/1973 (the counterpart of which is U.S. Pat. No. 4,037,937) and Japanese Laid Open Patent Application No. 1,242/1974 (the counterpart of which is U.S. Pat. No. 3,973,831). These known lenses are all unsatisfactory in respect of covering angle (field angle) which is only 30 degrees. Because of the narrow field angle, the distance between object plane and image plane allowable for a certain size of plate to be made is limited and directly determined by the angle. It is impossible to select a smaller object-image distance than that. For this reason, it has been difficult to realize a further reduction of the size of plate-making apparatus. The size reduction of plate-making apparatus may be achieved by widening the field angle of the photographing lens. However, it brings forth another problem. The correction of aberrations becomes more difficult with broadening the field angle and, therefore, it is hardly possible to maintain good image forming performance of the lens system.

SUMMARY OF THE INVENTION

Accordingly the object of the invention is to overcome the drawbacks of the prior art lens as described above and to provide a variable magnification lens for plate-making which is small in size and has a covering angle larger than 50 degrees, thereby enabling to substantially reduce the size of plate-making apparatus.

DESCRIPTION OF PREFERRED EMBODIMENTS

Figure 2:
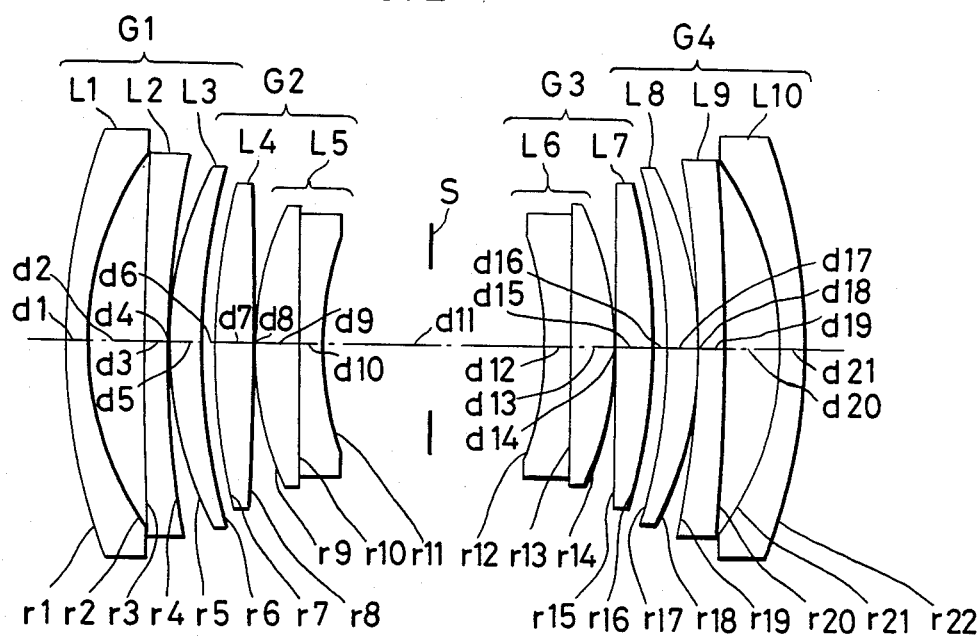
FIG. 2 shows the arrangement and construction of the lens elements of a first embodiment of the invention.

The wide angle and variable magnification lens system for finite distance to which the present invention is pertinet, consists of a first lens group whose focal length is negative as a whole, a second lens group whose focal length is positive as a whole, an aperture stop, a third lens group whose focal length is positive as a whole and a fourth lens group whose focal length is negative as a whole arranged in the named order from the object side and symmetrically relative to said aperture stop. The focal length of the total lens system is variable by changing the spacing between the first and the second lens groups and the spacing between the third and fourth lens groups by approximately the same amount. According to the invention, as shown in FIG. 2, the first lens group G1 comprises, in the order from the object side, a first component L1 of a negative meniscus lens with its concave surface facing toward the aperture stop, a second component L2 of a negative lens and a third component L3 of a positive meniscus lens with its convex surface facing toward the object side, and the fourth lens group G4 comprises, in the order from the image side, a tenth component L10 of a negative meniscus lens with its concave surface facing to the aperture stop, a ninth component L9 of a negative lens and an eighth component L8 of a positive meniscus lens with its convex surface facing toward the image side. According to a further feature of the present invention, the lens system satisfies the conditions $$-8 < \frac{r2 + r1}{r2 - r1} < -1.5 \quad (1)$$

$$0.8 < r5/r2 < 1.9 \quad (2)$$

wherein, r1 and r2 are curvature radii of the surfaces on object side and image side of the first component and r5 is the curvature radius of the object side surface of the third component.

If the upper limit of the condition (1) is exceeded, the curvature of image plane is too large and there is produced too large spherical aberration for magnifications larger or smaller than one-to-one magnification. On the other hand, if the lower limit of the condition (1) is exceeded, coma becomes worse and, therefore, the meridional image plane largely deviates in negative direction for magnifications larger and smaller than one-to-one magnification.

If the upper limit of the condition (2) is exceeded, the spherical aberration varies too much and the meridional image plane largely deviates in negative direction for magnifications far smaller and larger than one-to-one magnification. On the other hand, if the lower limit of the condition (2) is exceeded, the curvature of image plane is remarkedly large and coma becomes worse.

Figure 1:
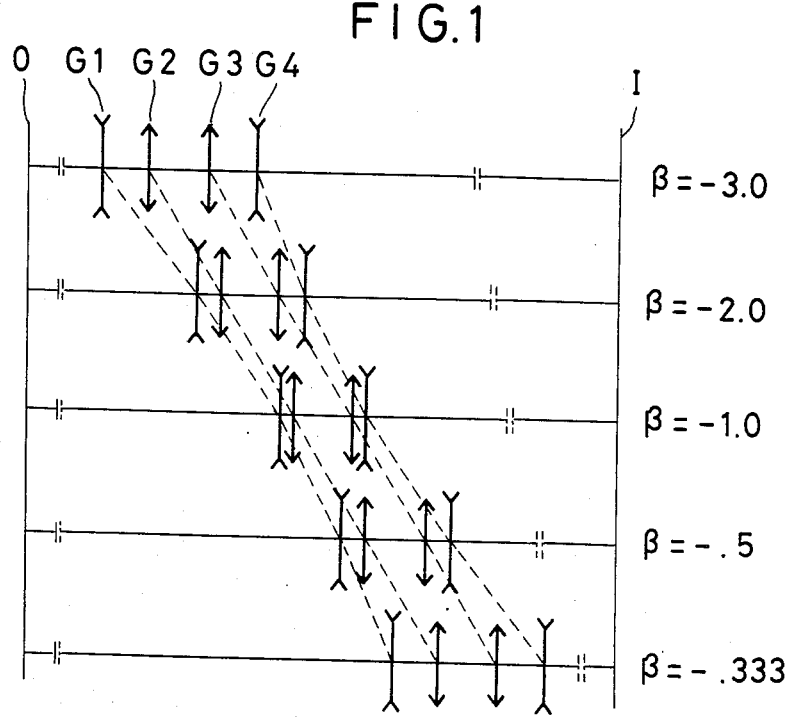
FIG. 1 illustrates the movement locuses of the lens groups with changing the magnification of a wide angle and variable magnification lens system for finite distance according to the present invention.

FIG. 1 illustrates the movements of the respective lens groups of a symmetrical four group zoom lens with the change of magnification. When the magnification $\beta$ changes in the range of from $-3.0$ to $-0.333$, the four lens groups G1, G2, G3 and G4 are moved as shown by dotted lines between the object plane O and the image plane in the figure. As easily seen from FIG. 1, both the separations between the first and second lens groups G1 and G2 and between the third and fourth lens groups G3 and G4 are the minimum when $\beta = -1.0$ i.e. one-to-one magnification. The locus of the lens movement for larger magnification than one-to-one and the locus of the lens movement for smaller magnification than one-to-one are symmetrical relative to the position of the lens groups for one-to-one magnification. In a basic structure of the invention, at least one of the first and second lens components L1 and L2 satisfies the following condition (3), in addition to the above-mentioned conditions:

$$\nu > 65 \quad (3)$$

wherein, $\nu$ is Abbe's number for d-ray ($\lambda = 587.6$ nm).

If the condition is not satisfied, then the lateral chromatic aberration becomes large for magnifications around one-to-one magnification.

In a further preferred embodiment of the invention, the lens system satisfies the following condition:

$$0.35 fo < |f1| < 0.85 fo \quad (4)$$

wherein, fo is the composite focal length of the total lens system obtained when the separations between the first and second lens groups G1 and G2 and between the third and fourth lens groups are the minimum, and f1 is the focal length of the first lens group G1.

This condition is important for realizing a small size system. When the focal length is over the upper limit of the condition, the changing range of the distance between the lens groups G1 and G2 required to reserve the necessary variation range of magnification is too large to obtain a small system. On the other hand, if the lower limit of the condition is exceeded, there arises difficulty in aberration correction although a small size system may be obtained.

In view of better aberration correction, it is preferable for the lens system to further satisfy the conditions:

$$3 < \left| \frac{r4 + r3}{r4 - r3} \right| + \frac{r6 + r5}{r6 - r5} < 11 \quad (5)$$

$$0.7 < |f2|/f3 < 1.4 \quad (6)$$

wherein, r3 is the curvature radius of the object side surface of the second, negative component L2 of the first lens group G1, r4 is the curvature radius of the image side surface (facing toward the aperture stop) of the second component L2, r5 is the curvature radius of the third, positive meniscus lens component L3 of the first lens group G1, r6 is the curvature radius of the image side surface (facing toward the aperture stop) of the third component L3, f2 is the focal length of the second component L2 and f3 is the focal length of the third component.

As previously noted, the second and third lens groups G2 and G3 are symmetrical with each other with respect to the aperture stop. A preferred form for these lens groups is that of the so-called Gaussian type which contains a cemented meniscus negative lens arranged on the inner side (the side facing to the aperture stop) of a positive lens. However, it is also possible to use that of the so-called ortho-metha type which contains a positive meniscus lens arranged on the inner side (the side facing to the aperture stop) of a negative lens. When the second and third lens groups G2 and G3 are of the Gaussian type, it is desirable to arrange the lens groups in such a manner as to satisfy the condition:

$$D > 0.04 fo \quad (7)$$

wherein, D is the distance on axis between the two lens groups.

Concrete examples of the lens system according to the invention will hereinafter be described as Examples 1 and 2.

EXAMPLE 1

This first example is shown in FIG. 2. In this example, as the second and third lens groups there are used those of Gaussian type. More particularly, the second lens group G2 consists of a positive lens L4 and a cemented negative meniscus lens L5 with its concave surface facing to the aperture stop. The construction of the third lens group G3 is symmetrical with that of the second lens group G2 with respect to the aperture stop. Numerical data of the first example are shown in the following table 1. The numbers in the first column of the table are the ordinal surface numbers from the object side.

TABLE 1

(Example 1)

f = 301.070~224.609  F No. 16
Field angle 2ω = 50°

| No. | Curvature radius r | Center thickness and air spacing between lenses d | Refractive index n | Abbe number ν | |
|---|---|---|---|---|---|
| 1 | 70.375 | 2.5 | 1.49782 | 82.5 | G1 |
| 2 | 35.950 | 7.0 | | | |
| 3 | 565.724 | 3.0 | 1.6228 | 57.0 | |
| 4 | 121.289 | 0.1 | | | |
| 5 | 48.665 | 3.8 | 1.64831 | 33.8 | |
| 6 | 72.048 | (d6) | | | |
| 7 | 65.770 | 5.0 | 1.62041 | 60.3 | G2 |
| 8 | ∞ | 0.1 | | | |
| 9 | 41.913 | 5.0 | 1.53996 | 59.7 | |
| 10 | 2425.39 | 3.0 | 1.67163 | 38.9 | |
| 11 | 41.871 | 25.66 | | | |
| 12 | −41.871 | 3.0 | 1.67163 | 38.9 | G3 |
| 13 | −2425.39 | 5.0 | 1.53996 | 59.7 | |
| 14 | −41.913 | 0.1 | | | |
| 15 | ∞ | 5.0 | 1.62041 | 60.3 | |
| 16 | −65.770 | (d16) | | | |
| 17 | −72.048 | 3.8 | 1.64831 | 33.8 | G4 |
| 18 | −48.665 | 0.1 | | | |
| 19 | −121.289 | 3.0 | 1.6228 | 57.0 | |
| 20 | −565.724 | 7.0 | | | |
| 21 | −35.950 | 2.5 | 1.49782 | 82.5 | |
| 22 | −70.375 | | | | |

| β | −1.0 | −0.5 | −0.333 |
|---|---|---|---|
| d6 | 1.484 | 5.184 | 11.184 |
| d16 | 1.484 | 5.184 | 11.184 |

Figure 3:
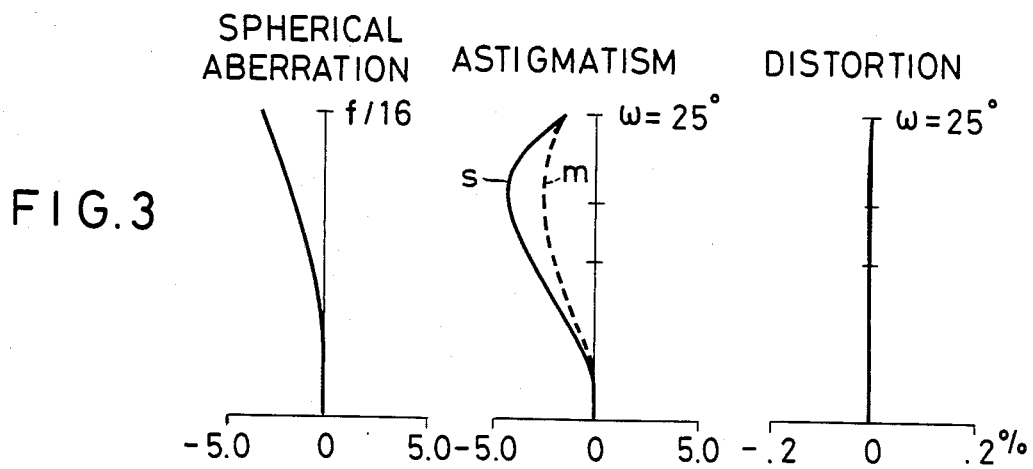
FIGS. 3 to 5 are aberrations curves of the first embodiment for different magnifications.
Figure 4:
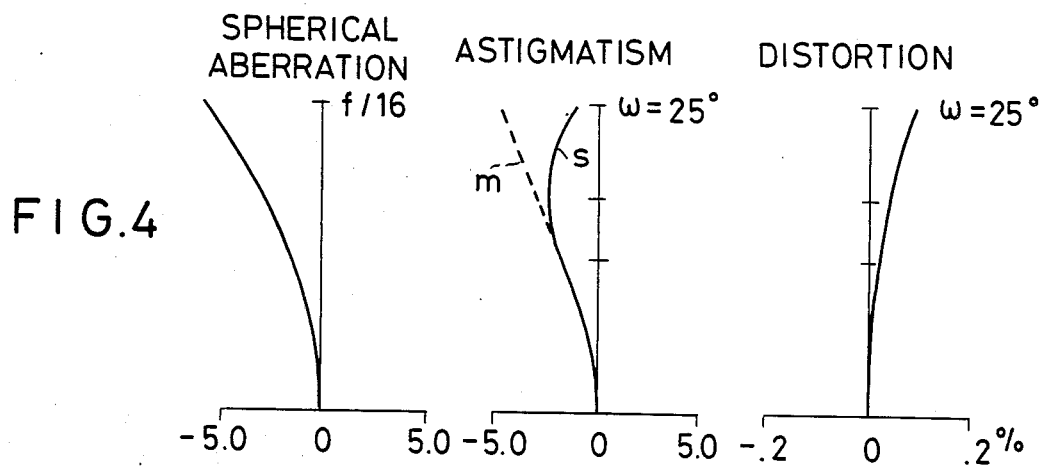
Figure 5:
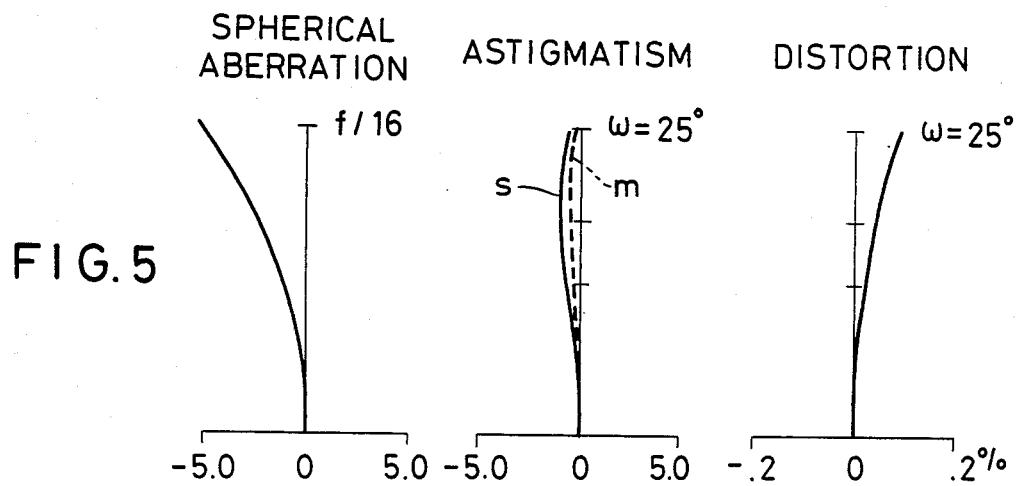

Aberrations of the first example are shown in FIGS. 3 to 5 of which FIG. 3 shows spherical aberration, astigmatism and distortion of the lens system at the photographing magnification $\beta = -1.0$, FIG. 4 shows those at $\beta = -0.5$ and FIG. 5 shows those at $\beta = -0.333$.

Figure 6:
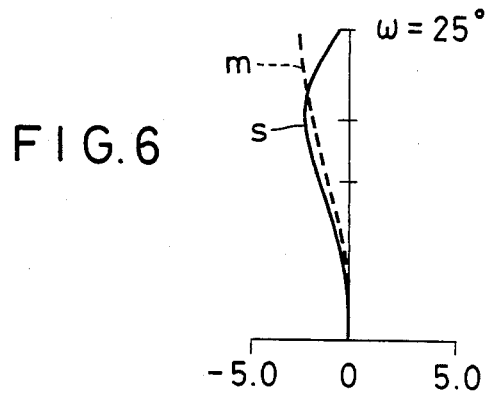
FIG. 6 is a aberration curve of astigmatism obtained when the spacing between the second and third lens groups G2 and G3 was changed.

In the lens system of above Example 1, the state of aberration, especially of astigmatism for a selected state of magnification can be improved by changing the air spacing between the lens groups G2 and G3, that is, the space of the aperture stop during the magnification change. More concretely, for magnifications near $\beta = -0.5$, the astimgmatism can be improved to the state shown in FIG. 6 from the state as in FIG. 4 by increasing the separation d11 between the two lens groups G2 and G3 up to 25.92 by an increment of 0.26. At the time of this correction, other aberrations remain substantially unchanged and maintain the state equivalent to that shown in FIG. 4. The correction value δ required for this purpose depends upon the configuration of the second and third lens groups. However, it has been found that a proper correction can be made when the correction value satisfies the condition:

$$0.0005f < \delta < 0.01f$$

wherein, f is the focal length of the total lens system at the time of correction.

If the correction value is under the lower limit of the condition, there will be produced substantially no effect for the correction of image plane. If any correction value larger than the upper limit of the condition is selected, there will be produced an adverse effect of over-correction.

EXAMPLE 2

Figure 7:
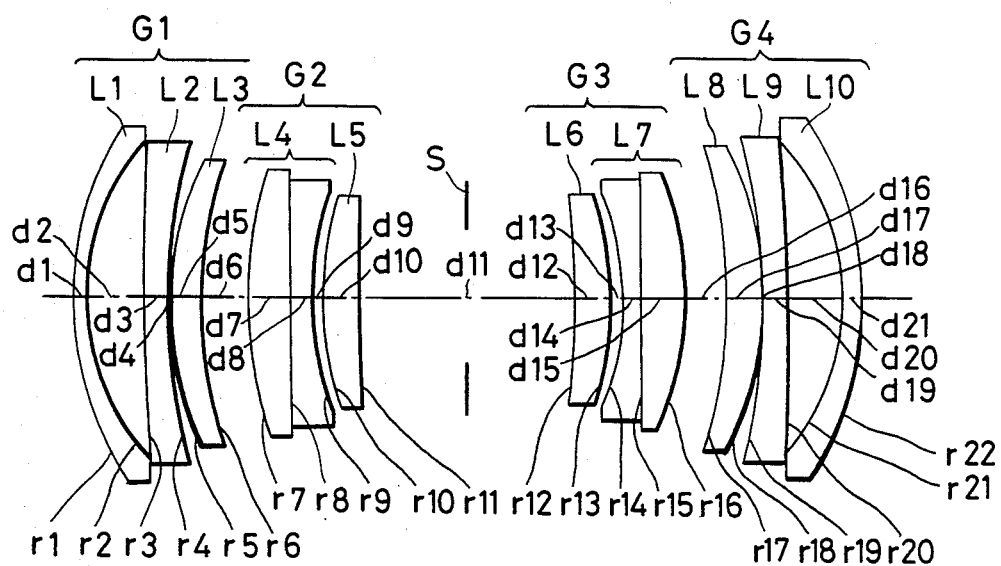
FIG. 7 shows the arrangement and construction of the lens elements of a second embodiment of the invention.

The second example of the lens system according to the invention is shown in FIG. 7. In this example, the second and third lens groups G2 and G3 are of the ortho-metha type. More particularly, the second lens group G2 consists of a cemented negative meniscus lens L4 and a positive meniscus lens L5 arranged in the named order from the object side. The convex surface of the negative meniscus lens L4 faces toward the object side and the convex surface of the positive meniscus lens L5 faces to the object side. The construction of the third lens group G3 is symmetrical to that of the second lens group G2 with respect to the aperture stop S.

Numerical data of the lens system of this Example 2 are shown in the following table 2.

TABLE 2

(Example 2)

f = 299.02~223.51   F No. 16
Field angle 2ω = 50°

| No. | Curvature radius r | Center thickness and air spacing between lenses d | Refractive index n | Abbe number ν | |
|---|---|---|---|---|---|
| 1 | 40.570 | 1.80 | 1.49782 | 82.5 | G1 |
| 2 | 28.770 | 6.50 | | | |
| 3 | 242.776 | 3.00 | 1.62041 | 60.3 | |
| 4 | 73.363 | 0.21 | | | |
| 5 | 36.698 | 3.844 | 1.64831 | 33.8 | |
| 6 | 48.271 | (d6) | | | |
| 7 | 45.776 | 5.283 | 1.58913 | 61.2 | G2 |
| 8 | 2351.44 | 1.917 | 1.66755 | 42.0 | |
| 9 | 32.188 | 1.598 | | | |
| 10 | 36.400 | 4.218 | 1.69350 | 53.8 | |
| 11 | 167.732 | 25.323 | | | |
| 12 | −167.732 | 4.218 | 1.69350 | 53.8 | G3 |
| 13 | −36.400 | 1.598 | | | |
| 14 | −32.188 | 1.917 | 1.66755 | 42.0 | |
| 15 | −2351.44 | 5.283 | 1.58913 | 61.2 | |
| 16 | −45.776 | (d16) | | | |
| 17 | −48.271 | 3.844 | 1.64831 | 33.8 | G4 |
| 18 | −36.698 | 0.21 | | | |
| 19 | −73.363 | 3.00 | 1.62041 | 60.3 | |
| 20 | −242.776 | 6.50 | | | |
| 21 | −28.770 | 1.80 | 1.49782 | 82.5 | |
| 22 | −40.570 | | | | |

| β | −1.0 | −0.5 | −0.333 |
|---|---|---|---|
| d6 | 5.378 | 9.078 | 14.978 |
| d16 | 5.378 | 9.078 | 14.978 |

Figure 8:
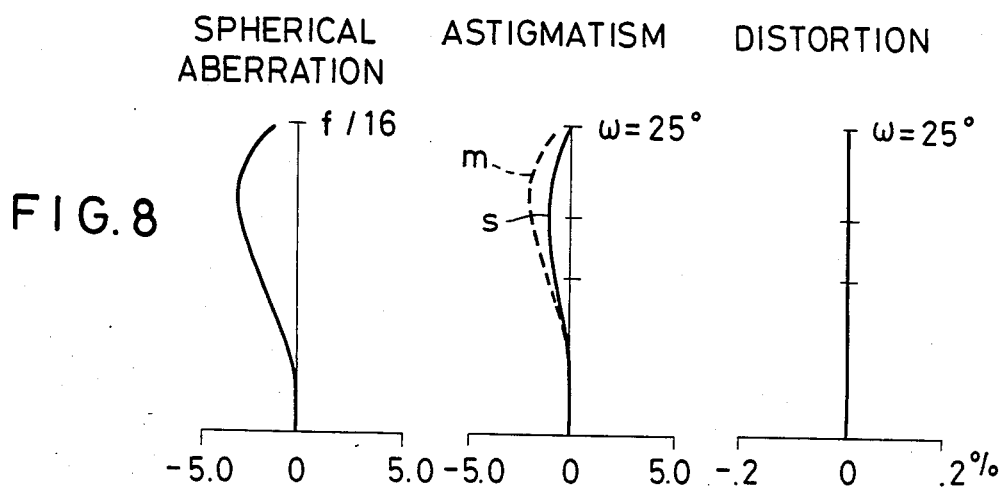
FIGS. 8 to 10 are aberration curves of the second embodiment for different magnifications.
Figure 9:
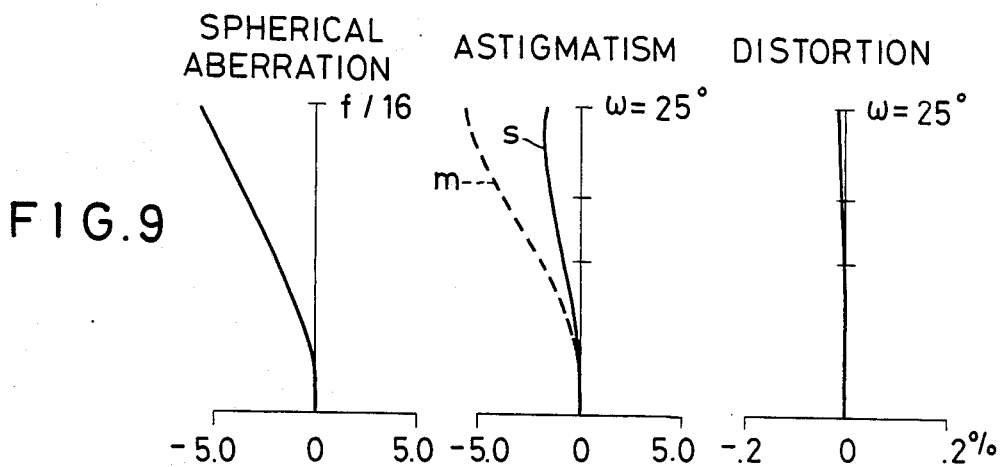
Figure 10:
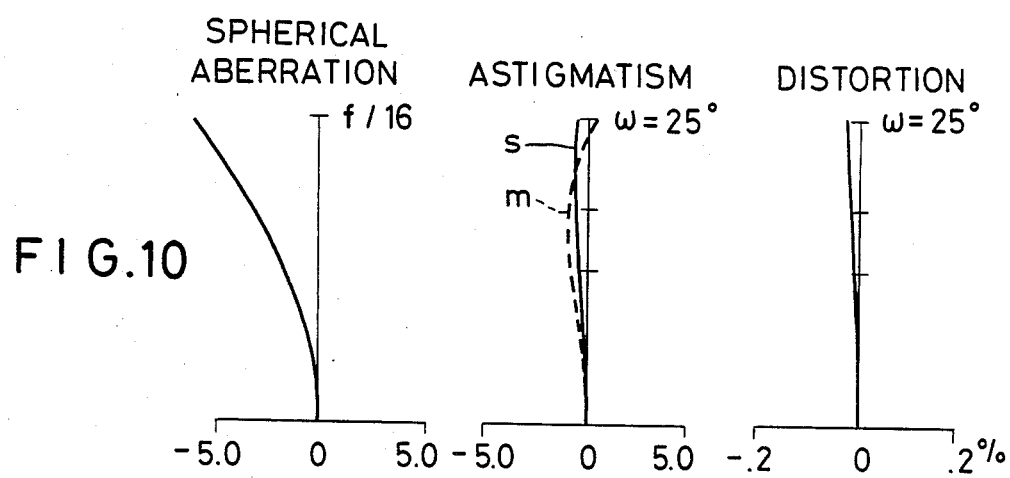

Aberrations of the lens system of above Example 2 are shown in FIGS. 8 to 10 of which FIG. 8 shows the aberration for β = −1.0, FIG. 9 for β = −0.5 and FIG. 10 for β = −0.333.

Both of the Examples 1 and 2 have a large field angle of 50 degrees and a broad variation range of magnification. The aberration curves shown in FIGS. 3 to 6 and 8 to 10 demonstrate that the lens system according to the invention maintain good image forming performance over the broad variation range of magnification.

As readily understood from the foregoing, the present invention has realized a variable magnification lens system for plate-making which is small in construction having a field angle of 50 degrees and more and which can maintain good performance over the whole variation range of magnification. Therefore, the use of the lens system according to the invention enables to reduce the size of the plate making apparatus and to increase up the working efficiency of plate-making.

I claim:

1. A wide angle and variable magnification lens system of the type which comprises, in the order from the object side, a first lens group whose focal length is negative as a whole, a second lens group whose focal length is positive as a whole, an aperture stop, a third lens group whose focal length is positive as a whole and a fourth lens group whose focal length is negative as a whole arranged symmetrically relative to said aperture stop and in which the focal length of the total system can be changed by changing the distance between said first and second lens groups and the distance between said third and fourth lens groups in substantially the same amount, said lens system being characterized in that said first lens group comprises a negative meniscus lens component with its concave surface facing to said aperture stop, a negative lens component and a positive meniscus lens component with its convex surface facing to the object side arranged in the named order from the object side, and said fourth lens group comprises, in the order from the image side, a negative meniscus lens component with its concave surface facing to said aperture stop, a negative lens component and a positive meniscus lens component with its convex surface facing to the image side.

2. A lens system according to claim 1, wherein in order to correct astigmatism when the focal length is changed, the lens system is constructed so that the distance between said second and third lens groups is changed by a small amount.

3. A lens system according to claim 1, wherein said lens system satisfies the conditions $$-8 < \frac{r2 + r1}{r2 - r1} < -1.5 \text{ and} \tag{1}$$

$$0.8 < r5/r2 < 1.9 \tag{2}$$

wherein, r1 is the curvature radius of the object side lens surface of the negative meniscus lens component of said first lens group;

r2 is the curvature radius of the lens surface facing toward the aperture stop of said negative meniscus lens component; and r5 is the curvature radius of the object side lens surface of the positive meniscus lens component of said first lens group.

4. A lens system according to claim 3, wherein at least one of the negative meniscus lens component and the negative lens component in said first lens group satisfies the condition $$\nu > 65 \tag{3}$$

wherein, $\nu$ is Abbe number for d-line ($\lambda = 587.6$ nm).

5. A lens system according to claim 4, wherein the lens system satisfies the condition $$0.35 f_o < |f1| < 0.85 f_o \tag{4}$$

wherein, fo is the composite focal length of the total lens system obtained when the distance between said first and second lens groups and the distance between said third and fourth lens groups are the minimum, and f1 is the focal length of said first lens group.

6. A lens system according to claim 5, wherein said lens system satisfies the conditions $$3 < \left| \frac{r4 + r3}{r4 - r3} \right| + \frac{r6 + r5}{r6 - r5} < 11 \tag{5}$$

and $$0.7 < |f2|/f3 < 1.4 \tag{6}$$

wherein, r3 is the curvature radius of the object side surface of the negative lens component of said first lens group;

r4 is the curvature radius of the surface facing to said aperture stop of said negative lens component;

r5 is the curvature radius of the object side surface of the positive meniscus lens component of said first lens group;

r6 is the curvature radius of the surface facing to said aperture stop of said positive meniscus lens component;

f2 is the focal length of said negative lens component; and f3 is the focal length of said positive meniscus lens component.

7. A lens system according to claim 6, wherein said second and third lens groups are mutually symmetrically constructed with respect to said aperture stop and each compises a positive lens component and a cemented negative meniscus lens component positioned on the aperture stop side of said positive lens component.

8. A lens system according to claim 7, wherein said lens system satisfies the condition $$D > 0.04 f_o$$

wherein, D is the distance on axis between said second and third lens groups when the distance between said third and second lens groups and the distance between said third and fourth lens groups are minimum.

9. A lens system according to claim 8 as represented by the following data:

f = 301.070~224.609    F No. 16
Field angle $2\omega = 50°$

| No. | Curvature radius r | Center thickness and air spacing between lenses d | Refractive index n | Abbe number $\nu$ | |
|---|---|---|---|---|---|
| 1 | 70.375 | 2.5 | 1.49782 | 82.5 | G1 |
| 2 | 35.950 | 7.0 | | | |
| 3 | 565.724 | 3.0 | 1.6228 | 57.0 | |
| 4 | 121.289 | 0.1 | | | |
| 5 | 48.665 | 3.8 | 1.64831 | 33.8 | |
| 6 | 72.048 | (d6) | | | |
| 7 | 65.770 | 5.0 | 1.62041 | 60.3 | G2 |
| 8 | ∞ | 0.1 | | | |
| 9 | 41.913 | 5.0 | 1.53996 | 59.7 | |
| 10 | 2425.39 | 3.0 | 1.67163 | 38.9 | |
| 11 | 41.871 | 25.66 | | | |
| 12 | −41.871 | 3.0 | 1.67163 | 38.9 | G3 |
| 13 | −2425.39 | 5.0 | 1.53996 | 59.7 | |
| 14 | −41.913 | 0.1 | | | |
| 15 | ∞ | 5.0 | 1.62041 | 60.3 | |
| 16 | −65.770 | (d16) | | | |
| 17 | −72.048 | 3.8 | 1.64831 | 33.8 | G4 |
| 18 | −48.665 | 0.1 | | | |
| 19 | −121.289 | 3.0 | 1.6228 | 57.0 | |
| 20 | −565.724 | 7.0 | | | |
| 21 | −35.950 | 2.5 | 1.49782 | 82.5 | |
| 22 | −70.375 | | | | |

| $\beta$ | −1.0 | −0.5 | −0.333 |
|---|---|---|---|
| d6 | 1.484 | 5.184 | 11.184 |
| d16 | 1.484 | 5.184 | 11.184 | where f is a focal length of the total lens system, and $\beta$ represents magnification.

10. A lens system according to claim 6, wherein said second and third lens groups are mutually symmetrically constructed with respect to said aperture stop and each comprises a negative lens component and a positive meniscus lens component positioned on the aperture stop side of said negative lens component.

11. A lens system according to claim 10 as represented by the following data:

f = 299.02~223.51    F No. 16
Field angle $2\omega = 50°$

| No. | Curvature radius r | Center thickness and air spacing between lenses d | Refractive index n | Abbe number $\nu$ | |
|---|---|---|---|---|---|
| 1 | 40.570 | 1.80 | 1.49782 | 82.5 | G1 |
| 2 | 28.770 | 6.50 | | | |
| 3 | 242.776 | 3.00 | 1.62041 | 60.3 | |
| 4 | 73.363 | 0.21 | | | |
| 5 | 36.698 | 3.844 | 1.64831 | 33.8 | |
| 6 | 48.271 | (d6) | | | |
| 7 | 45.776 | 5.283 | 1.58913 | 61.2 | G2 |
| 8 | 2351.44 | 1.917 | 1.66755 | 42.0 | |
| 9 | 32.188 | 1.598 | | | |
| 10 | 36.400 | 4.218 | 1.69350 | 53.8 | |
| 11 | 167.732 | 25.323 | | | |
| 12 | −167.732 | 4.218 | 1.69350 | 53.8 | G3 |
| 13 | −36.400 | 1.598 | | | |
| 14 | −32.188 | 1.917 | 1.66755 | 42.0 | |
| 15 | −2351.44 | 5.283 | 1.58913 | 61.2 | |
| 16 | −45.776 | (d16) | | | |
| 17 | −48.271 | 3.844 | 1.64831 | 33.8 | G4 |
| 18 | −36.698 | 0.21 | | | |
| 19 | −73.363 | 3.00 | 1.62041 | 60.3 | |
| 20 | −242.776 | 6.50 | | | |
| 21 | −28.770 | 1.80 | 1.49782 | 82.5 | |
| 22 | −40.570 | | | | |

| $\beta$ | −1.0 | −0.5 | −0.333 |
|---|---|---|---|
| d6 | 5.378 | 9.078 | 14.978 |
| d16 | 5.378 | 9.078 | 14.978 | where f is a focal length of the total lens system, and $\beta$ represents magnification.

* * * * *